United States Patent
Weiss

(10) Patent No.: US 6,354,950 B1
(45) Date of Patent: Mar. 12, 2002

(54) FLEXIBLE SHAFT COUPLING WITH LAMELLAS CONNECTED BY ELASTIC MATERIAL AND SPACED AXIALLY FROM ONE ANOTHER

(75) Inventor: Rudolf Weiss, Vreden (DE)

(73) Assignee: ATEC-Weiss GmbH & Co., KG (DE)

( * ) Notice: Subject to any disclaimer, the term of this patent is extended or adjusted under 35 U.S.C. 154(b) by 0 days.

(21) Appl. No.: 09/626,136

(22) Filed: Jul. 26, 2000

(30) Foreign Application Priority Data

Jul. 27, 1999 (DE) .......................... 199 34 469

(51) Int. Cl.⁷ ................................ F16D 3/58
(52) U.S. Cl. .................... 464/95; 264/273; 264/277
(58) Field of Search .............. 464/69, 93, 98, 464/94, 99, 95, 96; 264/261, 267, 277, 273

(56) References Cited

U.S. PATENT DOCUMENTS

| | | | | | |
|---|---|---|---|---|---|
| 1,455,242 A | * | 5/1923 | Corgiat, Jr. et al. | ...... | 464/69 X |
| 1,514,181 A | * | 11/1924 | Stanwood | ...... | 464/95 |
| 1,563,231 A | * | 11/1925 | Schell | ...... | 464/95 |
| 1,894,175 A | * | 1/1933 | Hemeon | ...... | 464/95 |
| 2,712,741 A | * | 7/1955 | Roller | ...... | 464/95 |
| 3,304,358 A | * | 2/1967 | De Jean et al. | ...... | 264/273 X |
| 3,800,557 A | * | 4/1974 | Tobin | ...... | 464/94 |
| 4,019,345 A | | 4/1977 | Fukuda | | |
| 5,901,964 A | * | 5/1999 | Williams et al. | ...... | 277/326 |

FOREIGN PATENT DOCUMENTS

| | | | |
|---|---|---|---|
| DE | 700 241 | 12/1940 | |
| DE | 34 37 388 A1 | 6/1985 | |
| DE | 35 01 415 A1 | 7/1985 | |
| DE | G 85 03 026 | 6/1986 | |
| DE | 40 16 235 C1 | 9/1991 | |
| DE | 197 42 361 A1 | 4/1999 | |
| EP | 359 916 A1 | 3/1990 | |
| FR | 2 409 417 | 6/1979 | |
| JP | 62-155335 | * 7/1987 | .................. 464/98 |
| JP | 04157210 | 5/1992 | |

OTHER PUBLICATIONS

"Moderne Konstruktionswerkstoffe für den Kupplungsbau", antriebstechnik 36 (1997), No. 11, pp. 58 & 60, discloses the use of lamellas made of fiber reinforced material for making couplings.

* cited by examiner

Primary Examiner—Lynne H. Browne
Assistant Examiner—Greg Binda
(74) Attorney, Agent, or Firm—Dick and Harris

(57) ABSTRACT

The invention relates to a flexible shaft coupling whose two coupling halves, each comprising a connecting flange, are connected to one another by means of a lamella packet collar so as to rotate together but be axially and angularly movable relative to one another, wherein the lamella packet collar is comprised of several lamellas axially spaced by spacer elements and is fastened by means of circumferentially distributed fastening and clamping elements alternatingly to the two connecting flanges. For reducing or preventing noise which is caused by the bending movements of the lamellas as a result of the angular misalignment compensation, it is provided that the lamellas are connected with one another by an elastic material in a positive-locking manner in that the lamellas are embedded in the elastic material so that the elastic material is also arranged between the lamellas and at the outer sides of the lamella packet collar.

5 Claims, 2 Drawing Sheets

FLEXIBLE SHAFT COUPLING WITH LAMELLAS CONNECTED BY ELASTIC MATERIAL AND SPACED AXIALLY FROM ONE ANOTHER

BACKGROUND OF THE INVENTION

1. The Technical Field

The invention relates to a flexible shaft coupling whose two coupling halves, each comprising a connecting flange, are connected to one another by means of a lamella packet collar so as to rotate together but be axially and angularly movable relative to one another, wherein the lamella packet collar is formed of several lamellas axially spaced by spacer elements and is fastened by means of circumferentially distributed fastening and clamping elements alternatingly to the two connecting flanges.

2. The Prior Art

Such couplings are known and have proven successful in practice. They allow the compensation of an axial misalignment as well as an angular misalignment of the shafts to be connected with one another. Depending on the revolutions per minute and the angular misalignment, however, unpleasant noise may result because the lamellas are subjected to bending movements for each shaft rotation as a result of the angular misalignment.

The present invention has therefore the object to provide a coupling of the aforementioned kind in which no unpleasant noise, or a substantially reduced noise, occurs as a result of the bending movements caused by the angular misalignment compensation of the lamellas.

SUMMARY OF THE INVENTION

This object is solved according to the invention in that the lamellas are connected to one another by means of an elastic material in a positive-locking manner in that the lamellas are embedded in the elastic material so that the elastic material is arranged between the lamellas and at the outer sides of the lamella packet collar.

The molding process can take place after mounting of the lamella packet collar comprised of the clamping elements, the lamellas, and the spacer elements. Thus, with regard to manufacturing technology, the invention can be realized in a relatively simple manner.

Tests have shown that with a coupling modified in this way no unpleasant noise occurs as a result of the bending movements caused by the angular misalignment compensation.

A preferred embodiment of the coupling according to the invention resides in that the lamellas in the area between the fastening and clamping elements have several bores in which the elastic material is positive-lockingly molded. With this measure, an especially good and permanent connection between the lamellas and the elastic material is ensured because the elastic material is connected via all lamellas with one another.

A further preferred embodiment resides in that the width of the lamellas, starting at the fastening and clamping elements, tapers in the direction toward the center between the fastening and clamping elements. This improves the flexibility of the lamellas and thus of the shaft coupling while the strength of the lamellas in the area of the fastening and threading locations at the connecting flanges remains still sufficiently high. Further preferred and advantageous embodiments of the coupling according to the invention are provided in the dependent claims.

In the following the invention will be explained in more detail with the aid of the drawing illustrating one embodiment. It is shown in detail in:

DETAILED DESCRIPTION OF THE DRAWINGS

Figure 1:
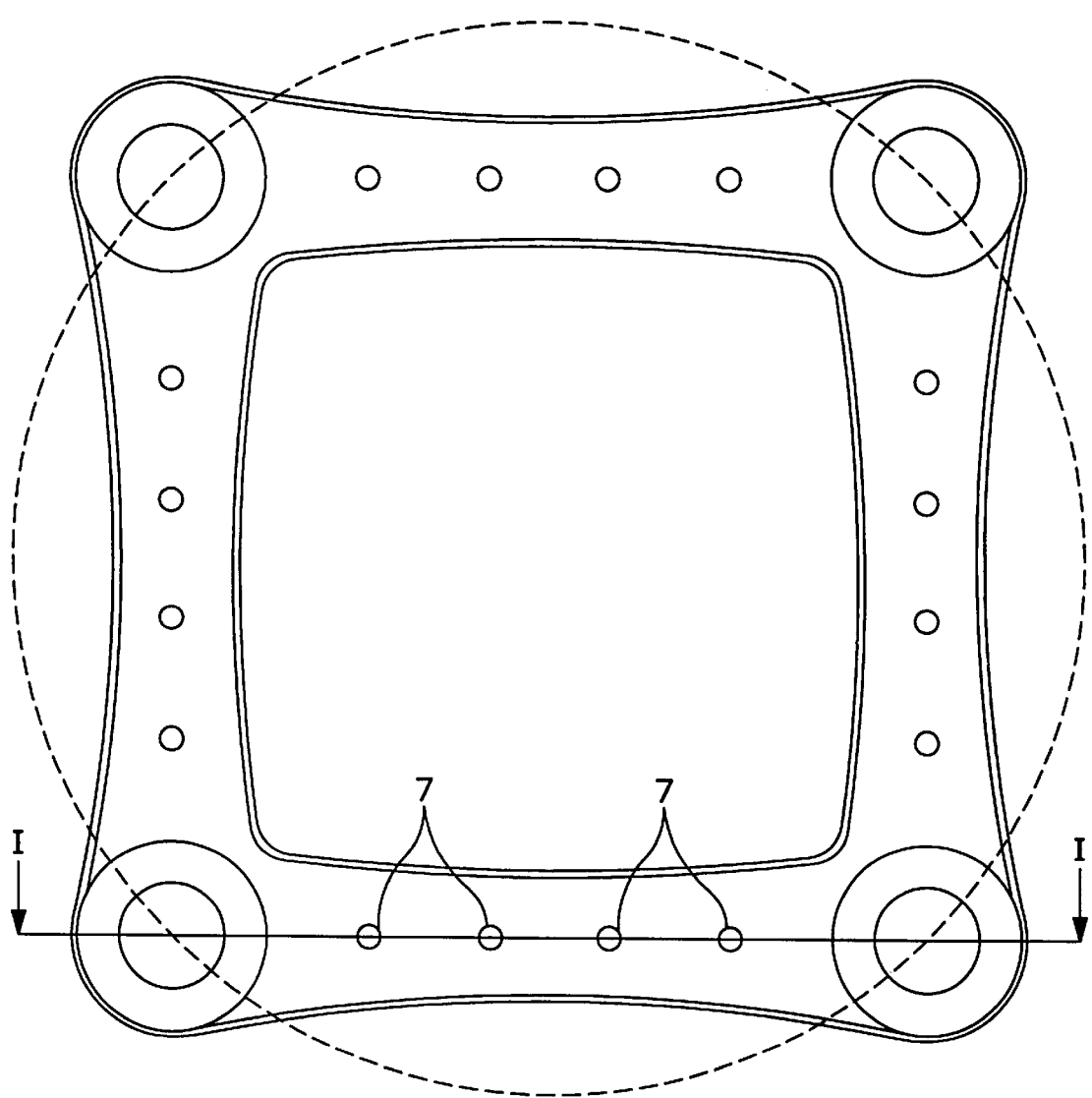
FIG. 1 a plan view onto a lamella packet collar of a shaft coupling according to the invention.
Figure 2:
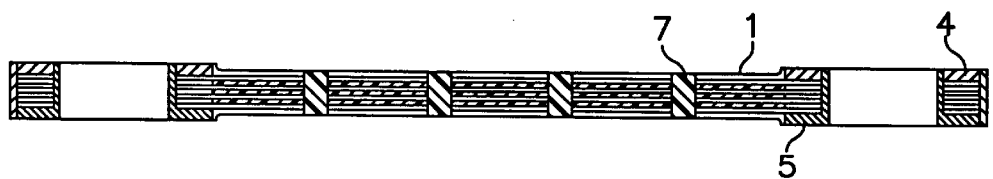
FIG. 2 is a sectional view of the lamella packet collar according to FIG. 1 along section line I—I.

The lamella packet collar represented in the drawing is comprised of several ring-shaped lamellas 2 that are axially spaced from one another and have four fastening bores 6 arranged on a common circle and uniformly spaced from one another. The width of the lamellas 2 tapers from the fastening bores toward the intermediately positioned center. Furthermore, four uniformly spaced bores 7 are symmetrically arranged, respectively, in the area between the fastening bores 6.

Figure 3:
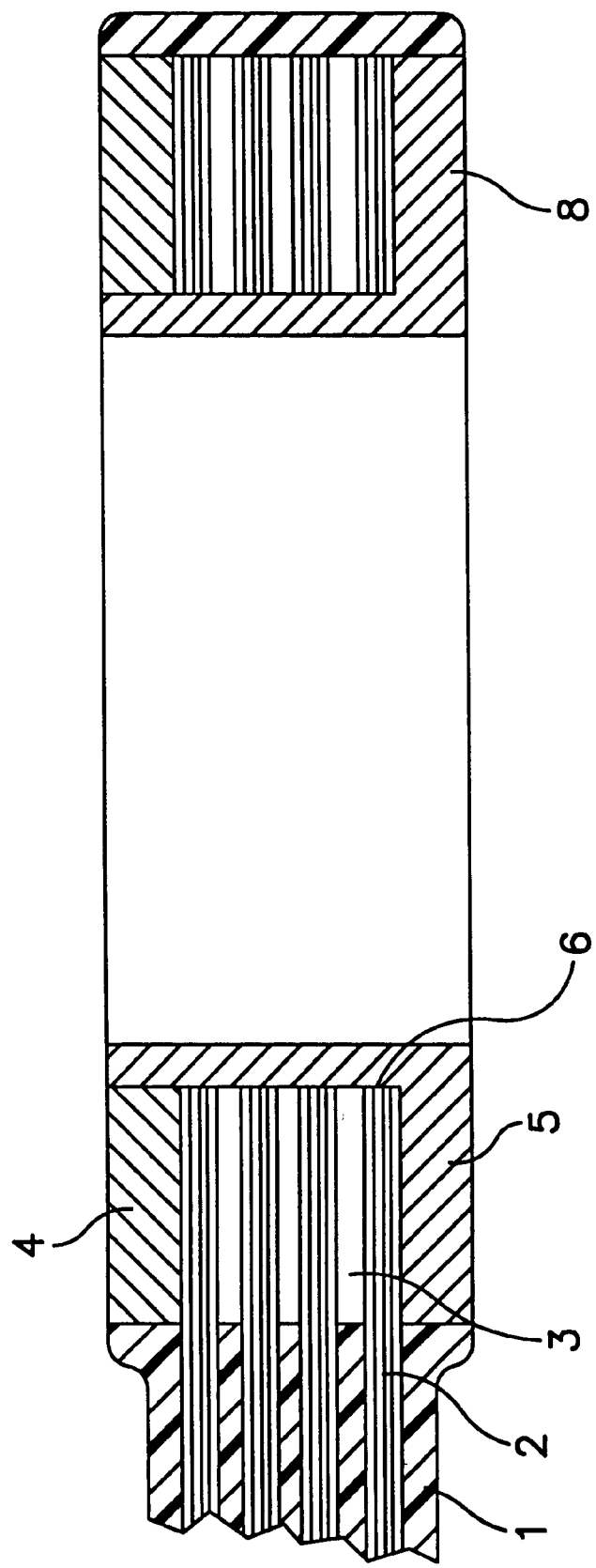
FIG. 3 shows an enlarged detail of FIG. 2 in the area of a fastening point of the lamella packet collar.

A clamping bushing 5 extends through the fastening bores 6 of the lamellas 2, respectively, and has a collar 8, wherein one of the lamellas 2 rests directly against the collar 8 of the clamping bushing 5 (see FIG. 3). Annular distance plates 3 are arranged on the clamping busing 5 between the lamellas 2. The inner diameter of the annular distance plates 3 corresponds to the diameter of the fastening bores 6 of the lamellas 2, while the outer diameter corresponds to the outer diameter of the collar 8 of the cylindrical clamping bushing 5. Moreover, each clamping bushing 5 has arranged thereat a disc-shaped clamping ring 4 which has the same inner diameter and the same outer diameter as the annular distance plates 3, while its thickness, however, corresponds approximately to the thickness of the collar 8 of the clamping bushing 5.

The lamellas 2 can be comprised of individual lamellas or lamella packets.

The thus assembled lamella packet collar, with the exception of the axial surfaces of the clamping bushings 5 as well as of the clamping rings 4, is embedded in an elastic material 1 so that the area between the spaced lamellas 2 and their bores 7 is filled with elastic material 1 and the outer sides of the lamellas 2 are embedded in the elastic material 1. The lamellas and the elastic material form thus a flexible composite body. The elastic material 1 is flush with the axial surfaces of the clamping bushing 5 as well as of the clamping rings 4. The elastic material 1 can be comprised, for example, of polyurethane and may contain strength-reinforcing fibers.

The thus pre-manufactured lamella packet collar is then screwed alternatingly to the connecting flanges of the coupling halves (not shown) of a correspondingly embodied shaft coupling via the clamping bushings 5 and the clamping rings 4 that are axially slipped on the bushings. For compensation of a radial misalignment the coupling can optionally additionally be provided with an intermediate sleeve and a further lamella packet collar according to the invention.

The invention is not limited to the afore described embodiment illustrated in the drawing. For example, the ring-shaped lamellas 2 can also have a different shape and can also have more than four fastening bores.

What is claimed is:

1. A flexible shaft coupling comprising:

two coupling halves, each including a connecting flange, said two coupling halves connected to one another by means of a lamella packet collar so as to rotate together but be axially and angularly movable relative to one another;

wherein the lamella packet collar is formed of several lamellas axially spaced by spacer elements and is fastened by means of circumferentially distributed fastening and clamping elements alternatingly to the two connecting flanges;

wherein the lamellas are positive-lockingly connected with one another by an elastic material in that the lamellas are embedded in the elastic material so that the elastic material is arranged between the lamellas and at the outer sides of the lamella packet collar; and wherein the lamellas comprise several bores in the area between the fastening and clamping elements, into which bores the elastic material is positive-lockingly molded.

2. The flexible shaft coupling according to claim 1, characterized in that the lamellas are ring-shaped.

3. The flexible shaft coupling according to claim 1 characterized in that the width of the lamellas, starting at the fastening and clamping elements, tapers toward the center between the fastening and clamping elements.

4. The flexible shaft coupling according to claim 1, characterized in that the clamping elements are formed of clamping bushings each comprising a collar and clamping rings axially slipped thereon.

5. The flexible shaft coupling according to claim 1, characterized in that the spacer elements are comprised of annular distance plates slipped axially onto the clamping bushings.

* * * * *